United States Patent
Stekkelpak

(10) Patent No.: US 9,256,343 B1
(45) Date of Patent: Feb. 9, 2016

(54) DYNAMICALLY MODIFYING AN ELECTRONIC ARTICLE BASED ON COMMENTARY

(75) Inventor: Zoltan Stekkelpak, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 530 days.

(21) Appl. No.: 13/471,142

(22) Filed: May 14, 2012

(51) Int. Cl.
*G06F 17/00* (2006.01)
*G06F 3/0481* (2013.01)
*G06F 17/24* (2006.01)

(52) U.S. Cl.
CPC ............ *G06F 3/0481* (2013.01); *G06F 17/241* (2013.01)

(58) Field of Classification Search
CPC .............................. G06F 3/0481; G06F 17/241
USPC .......................................... 715/230, 232, 233
See application file for complete search history.

(56) References Cited

U.S. PATENT DOCUMENTS

| 6,397,209 | B1 | 5/2002 | Reed et al. |
| 7,461,368 | B2 | 12/2008 | White |
| 8,326,684 | B1 * | 12/2012 | Halahmi et al. ............. 705/14.4 |
| 2005/0028194 | A1 | 2/2005 | Elenbaas et al. |
| 2007/0174343 | A1 | 7/2007 | Fortuna |
| 2009/0019013 | A1 | 1/2009 | Tareen et al. |
| 2009/0157714 | A1 | 6/2009 | Stanton et al. |
| 2009/0319449 | A1 | 12/2009 | Gamon et al. |
| 2010/0162093 | A1 * | 6/2010 | Cierniak ....................... 715/205 |
| 2010/0241968 | A1 * | 9/2010 | Tarara et al. ................... 715/751 |
| 2013/0080266 | A1 * | 3/2013 | Molyneux et al. .......... 705/14.72 |

* cited by examiner

*Primary Examiner* — Stephen Hong
*Assistant Examiner* — Matthew Ludwig
(74) *Attorney, Agent, or Firm* — McDermott Will & Emery LLP

(57) ABSTRACT

In one general aspect, a computer-readable storage medium can be configured to store instructions that when executed cause at least one processor of a computer system to perform a process. The process can include receiving from a user account an indicator of a request for an electronic article hosted at an article host, and receiving an indicator of a location within the electronic article targeted for placement of at least a portion of a comment within the electronic article. The process can also include processing, in response to the indicator of the request, a plurality of comments associated with the electronic article and posted via a plurality of user accounts, and placing, based on the processing and before the electronic article is served, at least a portion of a comment from the plurality of comments at the location to customize the electronic article for the user account.

22 Claims, 7 Drawing Sheets

94

Electronic Article Title

By Writer | Saturday, July | 38 Comments | Issue No. 5

W1

" Comment 25 – by Commentary Writer from Acme, LLC

I believe that at various times . . . . important to consider whether . . . without an understanding . . . . resolution of these important issues cannot be achieved.

Commentary Writer
CEO, Acme, LLC "

DYNAMICALLY MODIFYING AN ELECTRONIC ARTICLE BASED ON COMMENTARY

BACKGROUND

This description relates to dynamically modifying an electronic article based on commentary. Electronic articles can be hosted by, for example, an article host (e.g., a webserver) and are relatively static in their presentation. Although some aspects of electronic articles such as font size, pagination, and so forth may be customizable, the electronic articles may remain relatively static and un-personalized. Some electronic articles are configured so that various users reading the electronic articles can comment on the electronic articles, but these comments may be appended to the end or after the text of the electronic article so that they are not readily consumed (e.g., viewed) by readers of the electronic article in a desirable fashion. Even if the comments related to the electronic article are accessed, many of the comments may not be relevant to the electronic article or may include undesirable subject matter to some readers. Also, the comments may be posted in chronological order so that only the most recent comments may be readily viewed by a reader of the electronic article. Thus, a need exists for systems, methods, and apparatus to address the shortfalls of present technology and to provide other new and innovative features.

SUMMARY

In one general aspect, a computer-readable storage medium can be configured to store instructions that when executed cause at least one processor of a computer system to perform a process. The process can include receiving from a user account an indicator of a request for an electronic article hosted at an article host, and receiving an indicator of a location within the electronic article targeted for placement of at least a portion of a comment within the electronic article. The process can also include processing, in response to the indicator of the request, a plurality of comments associated with the electronic article and posted via a plurality of user accounts, and placing, based on the processing and before the electronic article is served, at least a portion of a comment from the plurality of comments at the location to customize the electronic article for the user account. Other aspects can be implemented in corresponding system, methods, and apparatus.

In some implementations, wherein the indicator of the location is identified within a user preference. In some implementations, the comment is a first comment, the location is associated with a portion of the electronic article identified as having a first opinion. The process can include identifying a location associated with a portion of the electronic article as having a second opinion different from the first opinion, and selecting at least a portion of a second comment from the plurality of comments for placement at the location associated with the portion of the electronic article identified as having a second opinion. In some implementations, a comment is excluded from the plurality of comments based on at least one word included in the comment.

In some implementations, the processing is performed based on natural language processing techniques. The process can include identifying the location within the electronic article based on the processing of the electronic article, and producing the indicator of the location in response to the identifying. In some implementations, the at least the portion of the comment is placed based on a size of the at least the portion of the comment. In some implementations, the indicator of the request is received at a time, and at least the portion of the comment is placed based on the comment being posted with a threshold time of the time. In some implementations, the indicator of the request is received at a time, and at least the portion of the comment is placed based on the comment being posted with a threshold time period from the time. In some implementations, the process can include triggering replacement of the at least the portion of the comment at the location after the electronic article has been served.

In another general aspect, a method can include receiving at an article modification module operating a computing device a plurality of requests for an electronic article, and receiving an indicator of a location within the electronic article for placement of at least a portion of a comment within the electronic article. The method can include processing a first comment from a plurality of comments associated with the electronic article, and processing a second comment from the plurality of comments associated with the electronic article. The method can also include placing, at a first time and in response to a request from the plurality of requests, the first comment from the plurality of comments at the location based on the processing of the first comment, and can include selecting, at a second time, the second comment from the plurality of comments for placement at the location based on the processing of the second comment. Other aspects can be implemented in corresponding system, apparatus and computer program products.

In some implementations, the processing associated with the first comment and the processing associated with the second comment are performed before the receiving of the request from the plurality of requests. In some implementations, the second comment is posted after the first time, and the processing the second comment is performed after the first time. In some implementations, the request is a first request from the plurality of requests, the first request from the plurality of requests is received before the first time and from a first user account, and a second request from the plurality of requests is received before the second time and from a second user account.

In some implementations, the placing, at the first time, is performed before the electronic article is served in response to the request from the plurality of requests. In some implementations, the processing associated with the first comment includes matching subject matter of the first comment with subject matter of the electronic article adjacent to the location. In some implementations, the method can include sending the electronic article after the placing of the first comment, and triggering replacement of the first comment by the second comment after the sending.

In yet another general aspect, an apparatus can include an article modification module configured to identify a location within an electronic article for placement of at least a portion of a plurality of comments associated with the electronic article where the location is associated with a viewpoint. The apparatus can include an article handler configured to receive a request to access the electronic article after the location within the electronic article has been identified. The apparatus can also include a commentary processor configured to process, in response to the receiving the request, a viewpoint associated with a comment from the plurality of comments. The apparatus can also include a commentary selection module configured to select the comment from the plurality of comments based on the viewpoint of the comment aligning with the viewpoint associated with the location. Other aspects can be implemented in corresponding system, methods, and computer program products.

In some implementations, the location is a first location, the viewpoint is a first viewpoint, and the comment is a first comment, the article modification module is configured to identify a second location associated with a second viewpoint opposing the first viewpoint. The commentary selection module can be configured to select a second comment from the plurality of comments based on a viewpoint of the second comment aligning with the second viewpoint associated with the second location. In some implementations, the comment is a first comment, and a second comment from the plurality of comments is excluded from selection based on content included in the second comment.

In some implementations, the commentary selection module is configured to compare the viewpoint of the comment with the viewpoint associated with the location before the selecting, and configured to insert the comment from the plurality of comments in the electronic article at the location after the selecting. The apparatus can include a commentary placement module configured to trigger sending of the electronic article. In some implementations, the plurality of comments is a first plurality of comments, and the commentary selection module is configured to select the first plurality of comments from a second plurality of comments based on a time window. In some implementations, the portion of the plurality of comments is associated with an interaction portion.

These and other aspects may provide one or more of the following advantages. One or more portions of commentary can be placed within an electronic article so that the one or more portions of the commentary can be viewed within the electronic article by a user of the electronic article. Various portions of comments can be included in an electronic article so that subsequent readers of the electronic article can have the benefit of the comments of other readers of the electronic article. In some implementations, various portions of the comments can be included in an electronic article so that the electronic article can be customized for a particular reader of the electronic article. Different portions of commentary can be dynamically placed into an electronic article (at different locations) for different readers of the electronic article. In some implementations, different portions of commentary can be placed in an electronic article for even the same user requesting the electronic article at different times.

The details of one or more implementations are set forth in the accompanying drawings and the description below. Other features will be apparent from the description and drawings, and from the claims.

BRIEF DESCRIPTION OF THE DRAWINGS

FIG. 1B is a diagram that illustrates an example of an electronic article, according to an implementation.

DETAILED DESCRIPTION

Figure 1A:
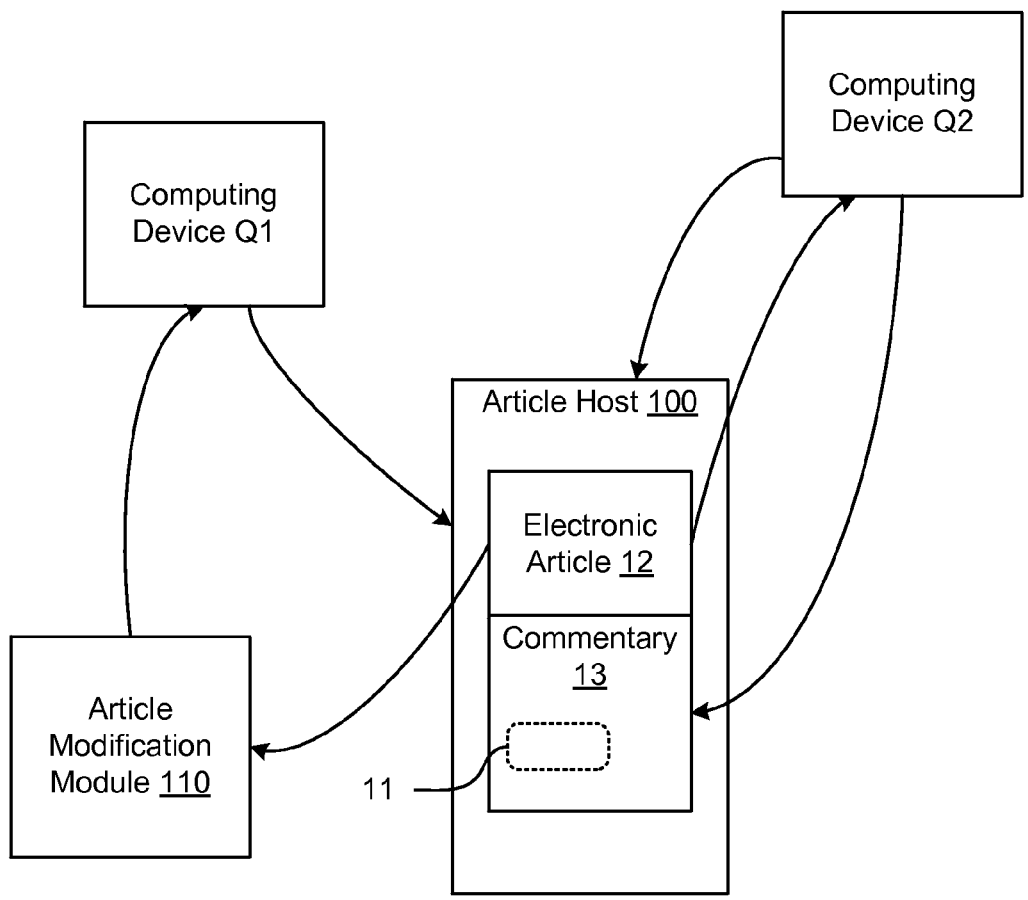
FIG. 1A is a diagram that illustrates an example article modification module configured to select a portion of commentary associated with an electronic article for placement in the electronic article.

FIG. 1A is a diagram that illustrates an article modification module 110 configured to select a portion 11 of commentary 13 associated with an electronic article 12 for placement in (e.g., inclusion in, insertion into, embedding within) the electronic article 12. As shown in FIG. 1A, the electronic article 12 can be modified by (e.g., customized by) the article modification module 110 with the portion 11 of the commentary 13 associated with electronic article 12 in response to a request by a computing device Q1 to access (e.g., view, consume) the electronic article 12 from an article host 100. In some implementations, the electronic article 12 can be modified by the article modification module 110 with the portion 11 of (or another portion of) the commentary 13 associated with electronic article 12 each time the electronic article 12 is requested by the computing device Q1. The portion 11 of the commentary 13 can be produced via a computing device Q2. The portion 11 of the commentary 13 can be produced via the computing device Q2 before the electronic article 12 portion of the commentary 13 is placed into the electronic article 12.

In some implementations, because the computing device Q1 is the device through which the electronic article 12 is being requested, the computing device Q1 can be referred to as a requesting device. In some implementations, a user (not shown) of the computing device Q1 can be referred to as a reader or viewer of the electronic article 12. In some implementations, the computing device Q2 can be referred to as a commentary producing device, because the computing device Q2 is the device through which the portion 11 of the commentary 13 is produced. In some implementations, a user (not shown) of the computing device Q2 can be referred to as an author of the portion 11 of the commentary 13.

For example, the electronic article 12 can be sent from the article host 100 to the computing device Q2 for viewing at the computing device Q2 in response to a request triggered by a user (via a user account) of the computing device Q2. The user can produce a comment about the electronic article 12 that is associated with (e.g., appended to, appended after text of) the electronic article 12 as the portion 11 of the commentary 13 via the computing device Q2. In some embodiments, the comment can be associated with the electronic article 12 via a social network, associated through a link, and/or so forth. After the portion 11 of the commentary 13 has been associated with the electronic article 12, the electronic article 12 can be requested for viewing at the computing device Q1. In response to the request for viewing at the computing device Q1, the electronic article 12 and/or the commentary 13 can be sent to the article modification module 110. The electronic article 12 can be modified with the portion 11 of the commentary 13, and the modified electronic article 12 can be sent (e.g., served) to the computing device Q1 for viewing by a user (via a user account) of the computing device Q1. Thus, the modified electronic article 12, with the portion 11 of the commentary 13 placed (e.g., inserted, embedded) therein, can be viewed by the user at the computing device Q1. In some implementations, if the electronic article 12 is requested for viewing by an additional computing device (not shown), the article modification module 110 can be configured to place the portion 11 of the commentary 13 or a different portion (not shown) of the commentary 13 in the electronic article 12 for viewing by a user of the additional computing device.

One or more portions of the commentary 13 can be placed within the electronic article 12 so that the one or more portions of the commentary 13 can be viewed within the electronic article 12 by a consumer (e.g., a user) of the electronic article 12. For example, the electronic article 12 can be an electronic news article about a sporting event. Multiple readers of the electronic article 12 can post one or more comments about the sporting event, which become part of the commentary 13 posted after the electronic article 12. The article modification module 110 can be configured to include (e.g., insert, embed) various portions of the comments into the electronic article 12 so that subsequent readers of the electronic news article can have the benefit of the comments (e.g., contrary or concurring comments) of other readers of the electronic article 12. In some implementations, the article modification module 110 can be configured to include (e.g., insert, embed) various portions of the comments into the electronic article 12 so that the electronic article 12 can be customized for a particular reader of the electronic article 12. In some implementations, the article modification module 110 can be configured to dynamically place different portions of the commentary 13 into the electronic article 12 (at different locations) for different readers of the electronic news article. In some implementations, different portions of the commentary 13 can be placed in the electronic article 12 for even the same user requesting the electronic article 12 at different times. Thus, the electronic article 12 can be updated with different portions of the commentary 13 for even the same user requesting the electronic article 12 at different times. In some implementations, dynamic processing can include processing in real-time, processing after a request for the electronic article 12 has been sent, processing during display of the electronic article 12, and/or so forth.

In some implementations, the portion 11 of the commentary 13 can be, or can include, any type of commentary related to the electronic article 12. In some implementations, the portion 11 of the commentary 13 can include, for example, one or more comments posted by one or more users at one or more times and appended to the end of the electronic article 12. In some implementations, the portion 11 of the commentary 13 can be, or can include, a comment, text (e.g., words), a character (e.g., an alphanumeric character), an image (e.g., an emoticon, a picture), a symbol, audio, video, a link (e.g., a hyperlink), and/or so forth. For example, the portion 11 of the commentary 13 can include a comment in support of a portion of the electronic article 12, a comment opposing a portion of the electronic article 12, a comment clarifying a portion of the electronic article 12, and/or so forth. In some implementations, the portion 11 of the commentary 13 can also include an identifier of an entity (e.g., a user) who produced the portion of the commentary 13. In some implementations, commentary 13 (or a portion thereof) can be referred to as public commentary because the commentary (or a portion thereof) can be publicly posted in association with the electronic article 12.

In some implementations, the commentary 13 may be commentary associated with an electronic article different from electronic article 12. In some implementations, the commentary 13 can be associated with a newsfeed, a social media application, a social media network, and/or so forth. For example, the commentary 13 can be commentary publically posted at a website related to the electronic article 12 or linked to the electronic article 12.

In some implementations, the electronic article 12 can be any type of electronic article. For example, the electronic article 12 can be a webpage, a social media posting (e.g., a posting to a user account associated with a social media application), an electronic news article, an electronic advertisement, and/or so forth.

In some implementations, the portion 11 of the commentary 13 can be selected by the article modification module 110 from the remaining portions of the commentary 13 for placement (e.g., insertion) in the electronic article 12. For example, if the commentary 13 includes multiple comments associated with electronic article 12, the article modification module 110 can be configured to select a comment from the multiple comments for placement in the electronic article 12.

In some implementations, the article modification module 110 can be configured to process (e.g., analyze, interpret) content of the portion 11 of the commentary 13, and can be configured to select the portion 11 of the commentary 13 for placement in (e.g., insertion into) at least a portion of the electronic article 12 based on the processing. For example, one or more natural language processing techniques, keyword search technologies, and/or so forth can be used by the article modification module 110 to process the content of the commentary 13, and determine whether or not to place a portion of the commentary 13 into the electronic article 12.

In some implementations, the article modification module 110 can be configured to dynamically determine whether or not to place the portion 11 of the commentary 13 into at least a portion of the electronic article 12. For example, the portion 11 of the commentary 13 can be dynamically placed into the portion of the electronic article 12 before (e.g., just before) (or in response to) the electronic article 12 is sent (e.g., served) to the computing device Q1 for, for example, viewing.

In some implementations, the portion 11 of the commentary 13 can be placed at a specified location within the electronic article 12. In some implementations, the location can be referred to as an insertion location or as a placement location. In some implementations, the location for placement of the portion 11 of the commentary 13 can be identified before the portion of the commentary 13 is selected from the commentary 13. In other words, the location for placement of one or more portions of the commentary 13 can be a predefined location.

Although not shown in FIG. 1A, in some implementations, multiple portions from the commentary 13 can be placed in the electronic article 12. For example, the portion 11 of the commentary 13 can be placed at a first location in the electronic article 12, and another portion (not shown) of the commentary 13 can be placed at a second location in the electronic article 12.

In some implementations, a location within the electronic article 12 for placement (e.g., insertion) of one or more portions of the commentary 13 can be dynamically determined. In some implementations, the location within the electronic article 12 can be identified based on processing of (e.g., an interpretation of a meaning of, processing of content) one or more portions of the electronic article 12 and/or one or more portions of the commentary 13. More details related to processing of commentary, selection of locations for placement of at least a portion of commentary, and/or so forth are described below.

As shown in FIG. 1A, the electronic article 12 and the commentary 13 associated with the electronic article 12 can be sent to one or more of the computing devices Q1, Q2 by the article host 100. In some implementations, the article host 100 can be configured to handle processing of requests to access (e.g., to view, to display) the electronic article 12 (and the associated commentary 13). In some implementations, electronic article 12 can be included in a webpage. In such implementations, the article host 100 can function as a web server of the webpage.

FIG. 1B is a diagram that illustrates an example of an electronic article 94, according to an implementation. As shown in FIG. 1B, the article includes several paragraphs W1 through W3, and a comment 96 inserted between the paragraphs W1 and W2.

Referring back to FIG. 1A, in some implementations, the computing devices Q1, Q2 can each be, for example, a wireless device (e.g., wi-fi enabled device) that includes wired components, and can be, for example, a computing entity (e.g., a personal computing device), a server device (e.g., a web server), a tablet computer, a mobile phone, a personal digital assistant (PDA) and/or so forth. The computing devices Q1, Q2 can be configured to operate based on one or more platforms (e.g., one or more similar or different platforms) that can include one or more types of hardware, software, firmware, operating systems, runtime libraries, and/or so forth.

In some implementations, at least a portion of the functionality of the article modification module 110 can be included in the computing device Q1. Accordingly, the portion 11 of the commentary 13 can be placed in the electronic article 12 at the computing device Q1. In some implementations, the portion 11 of the commentary 13 can be placed in the electronic article 12 before the electronic article 12 (which is modified with (e.g., customized with) the portion 11 of commentary 13) is presented (e.g., displayed) to a user of the computing device Q1.

In some implementations, at least a portion of the functionality of the article modification module 110 can be included in the article host 100. Accordingly, the portion 11 of the commentary 13 can be placed in the electronic article 12 at the article host 100 before the electronic article 12 (which is modified with the portion 11 of commentary 13) is sent to (e.g., served to) the computing device Q1.

In some implementations, the article modification module 110 can be, or can be associated with (e.g., included in), a social media application (not shown). The social media application can be any type of application (e.g., a smartphone application, a stand-alone application) that can be used by a user to share content and/or other information with a network of users (e.g., friends, relatives, colleagues, business associates) associated with the user. In some implementations, the social media application can be a web-based application that can be accessed by users. In some implementations, the social media application can be referred to as a social media system and can be part of a social media platform. In some implementations, the social media application can be associated with a social network service. In some implementations, the social media application can be a collaborative environment through which one or more users (such as a sharer and/or a consumer (e.g., user) of content) can engage in collaborative work. In some implementations, the social media application can include one or more search engines, social network services, forums, instant messaging/chat applications, virtual environments, peer-to-peer communications applications, and/or so forth. In some implementations, the social media application can include, or can be based on, one or more open application programming interfaces (APIs).

In some implementations, the article modification module 110 can be configured to operate at a host device (such as the article host 100). In such implementations, the article modification module 110 can be accessed through a network by one or more devices (such as computing devices Q1, Q2), which can function as client(s) to the article modification module 110 (which can be operating at a host). Accordingly, the functionality of the article modification module 110 can be called and/or executed on an on-demand basis. In some implementations, the article modification module 110 can function as a background application. In some implementations, the article modification module 110 can function as an application (or service) that can be accessed via an application programming interface (API).

Figure 2:
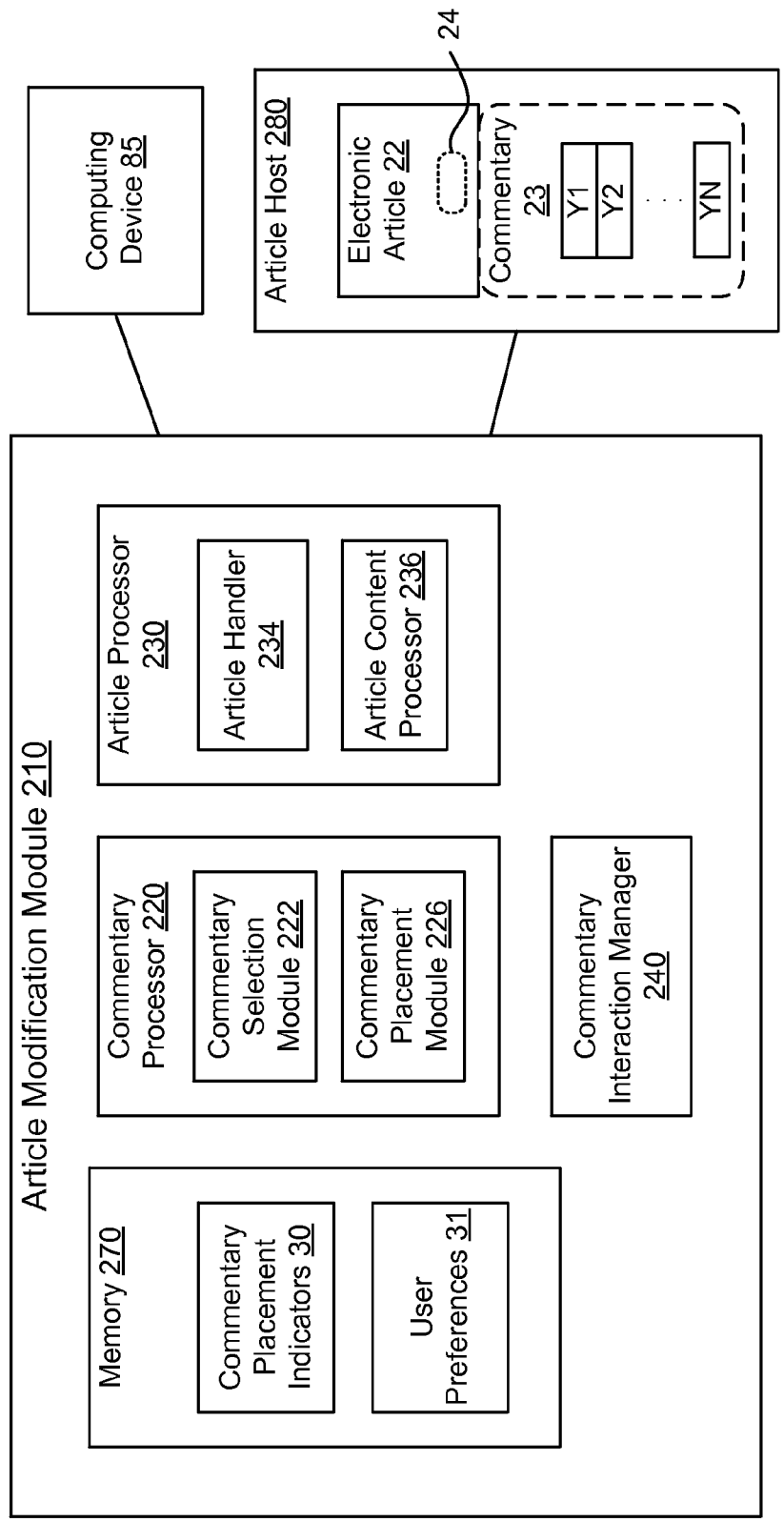
FIG. 2 is a diagram that illustrates an example article modification module according to an implementation.

FIG. 2 is a diagram that illustrates an article modification module 210 according to an implementation. As shown in FIG. 2, the article modification module 210 includes a commentary processor 220 and an article processor 230. The article modification module 210 can be configured to modify an electronic article 22 stored at an article host 280 with one or more comments Y1 through YN included as commentary 23 associated with the electronic article 22. The electronic article 22 can be modified in response to the electronic article 22 being requested by a computing device 85 (which can function as a requesting device). Although not shown in FIG. 2, in some implementations, one or more of the comments Y1 through YN can be produced via one or more user accounts associated with one or more computing devices (not shown).

As shown in FIG. 2, the article processor 230 includes an article handler 234. The article handler 234 can be configured to receive an indicator that the electronic article 22 has been requested. Specifically, the article handler 234 can be configured to receive an indicator that the electronic article 22 has been requested by the computing device 85. In some implementations, the indicator that the electronic article 22 has been requested can be produced in response to at least a portion of the electronic article 22 and/or at least a portion of the commentary 23 being received by the article modification module 210.

The article modification module 210 can be configured to process a commentary placement indicator 24 associated with the electronic article 22. In some implementations, the commentary placement indicator 24 can be referred to as a commentary placement parameter or as a commentary placement parameter value. In some implementations, the commentary placement indicator 24 can specify (e.g., describe, characterize) one or more conditions (e.g., constraints, boundaries, limitations) for placement of at least a portion of the commentary 23 in the electronic article 22. In other words, the commentary placement indicator 24 can specify one or more characteristics or attributes of at least a portion of the commentary 23 targeted to be placed in the electronic article 22. In some implementations, commentary (or comments) targeted for placement within the electronic article 22 can be referred to as target commentary (or as target comments).

In some implementations, the commentary placement indicator 24 can identify a location within the electronic article 22 for placement of at least a portion of the commentary 23 (e.g., one or more of the comments Y1 through YN (or portions thereof)). The location within the electronic article 22 for placement of at least a portion of the commentary 23 can be with respect to any portion of the electronic article 22 such as, for example, in a textual portion (e.g., a paragraph, a heading, a title) of the electronic article 22, between textual portions of the electronic article 22, before, after, or within an image included in the electronic article 22, and/or so forth. Although shown as being embedded in the electronic article 22 in FIG. 2, in some implementations, the commentary placement indicator 24 can be otherwise associated with the electronic article 22 (e.g., included as metadata with the electronic article 22). For example, the commentary placement indicator 24 can be a textual indicator, an icon, a flag, an HTML indicator, an instruction, and/or so forth that can be embedded within the electronic article 22 to identify a location within the electronic article 22 for placement of at least a portion of the commentary 23. As a specific example, the commentary placement indicator 24 can be a textual indicator or an icon that can be embedded within the electronic article 22 between two paragraphs of the electronic article 22 specifying a location for placement of at least a portion of the commentary 23. Although not shown in FIG. 2, multiple commentary placement indicators (similar to commentary placement indicator 24) can be associated with the electronic article 22.

In some implementations, the commentary placement indicator 24 can indicate a size of at least a portion of the commentary 23 to be placed (e.g., targeted to be placed) within the electronic article 22. For example, commentary placement indicator 24 can indicate that at least a portion of the commentary 23 less than a specified number of characters or greater than a specified number of characters may be placed at a specified location within the electronic article 22.

In some implementations, the commentary placement indicator 24 can indicate a temporal condition for at least a portion of the commentary 23 to be placed (e.g., targeted to be placed) within the electronic article 22. For example, the commentary placement indicator 24 can indicate that at least a portion of the commentary 23 produced during a specified time frame (e.g., a specified time window, a threshold period of time), after a specified date and/or time, and so forth may be placed within the electronic article 22.

In some implementations, the commentary placement indicator 24 can indicate specific information to be included in at least a portion of the commentary 23 selected for placement within the electronic article 22. For example, commentary placement indicator 24 can indicate that a comment including a specific word (e.g., keyword) or phrase can be selected or may not be selected for placement within the electronic article 22. Accordingly, a portion of the commentary 23 can include information in accordance with a condition (or characteristic) specified within the commentary placement indicator 24.

In some implementations, the comments Y1 through YN can be considered a pool of comments (or target pool of comments) from which a comment can be selected for placement in the electronic article 22. Thus, at least a portion of the commentary 23 can function as a pool of commentary from which a portion can be selected for placement in the electronic article 22.

In some implementations, at least a portion of the comments Y1 through YN can be excluded from a pool of comments from which a comment (or a portion thereof) can be selected for placement within the electronic article 22. In some implementations, the commentary placement indicator 24 can indicate that a particular comment should be excluded from a pool of comments if the particular comment has or does not have a particular characteristic. For example, comment Y2 can be excluded from (or alternatively included in) a pool of comments, from which a comment can be selected for placement in the electronic article 22, because the comment Y2 includes a particular word, was defined at a specified time (or during a time period), is longer than a specified length, and/or so forth.

In some implementations, at least a portion of the commentary 23 can be evaluated based on quality. For example, the commentary 23 can be processed by the commentary processor 220 to identify and exclude portions of the commentary 23 (e.g., from a pool of comments) that have spelling and/or grammatical errors, are identified as being related to spam, and/or so forth. In some implementations, one or more quality thresholds (e.g., quality criteria, error thresholds) can be specified within the commentary placement indicator 24. In some implementations, approval (e.g., likes) and/or disapproval of a portion of the commentary 23 by other users (other than the author of the portion of the commentary 23) can be used to evaluate the quality (or lack of quality) of the portion of the commentary 23.

In some implementations, the commentary placement indicator 24 can specify a certain number of comments to be placed within the electronic article 22. For example, the commentary placement indicator 24 can indicate that less than a certain number of comments or more than a certain number of comments are to be (or can be) placed within a particular location within the electronic article 22.

In some implementations, the commentary placement indicator 24 can indicate a characteristic of a user account (e.g., an authoring user account) associated with at least a portion of the commentary 23 to be placed within the electronic article 22. The commentary placement indicator 24, for example, can indicate that a comment may or may not be placed within the electronic article 22 based on a user account (e.g., a specific authorship) associated with the comment. For example, comment Y1 can be posted by a first user (e.g., an author) (via a first user account) within a social network of a second user (e.g., a reader) of the computing device 85 (through which the electronic article 22 is requested). The comment Y1 may or may not be placed in the electronic article 22 based on the relationship (e.g., a friend relationship, a business relationship, a family relationship) of the first user (e.g., an author) and the second user (e.g., a reader) within the social network of the second user. The relationship required for the comment Y1 to be selected for placement in the electronic article 22 can be specified within (or by) the commentary placement indicator 24.

In some implementations, the commentary placement indicator 24 can indicate content of at least a portion of the commentary 23 to be placed (e.g., targeted to be placed) within the electronic article 22. For example, the commentary placement indicator 24 can indicate that a comment having content supporting, opposing, having a particular type of opinion or viewpoint, and/or so forth, is to be placed within the electronic article 22. As a specific example, the commentary placement indicator 24 can indicate that at least a portion of the commentary 23 to be placed (e.g., targeted to be placed) within the electronic article 22 should include content supporting an opinion of a paragraph of the electronic article 22. Accordingly, if one of comments Y1 through YN includes content supporting the opinion of the paragraph, the comment can be placed in the electronic article 22.

As shown in FIG. 2, the commentary processor 220 includes a commentary selection module 222. The commentary selection module 222 can be configured to select at least a portion of the commentary 23 (e.g., one or more of the comments Y1 through YN (or a portion thereof)) for placement within the electronic article 22. In some implementations, the commentary selection module 222 can be configured to select at least a portion of the commentary 23 for placement within the electronic article 22 based on one or more conditions (e.g., constraints, boundaries, limitations, characteristics) specified by the commentary placement indicator 24.

In some implementations, the commentary selection module 222 can be configured to process any portion of the commentary 23 to select a portion of the commentary 23 for placement in the electronic article 22. For example, in some implementations, the commentary selection module 222 can be configured to process one or more portions of the commentary 23 based on natural language processing techniques, keyword matching, and/or so forth. As a specific example, the commentary placement indicator 24 can indicate that a comment having a particular opinion, type of content, and/or supporting a particular proposition within the electronic article 22 is to be placed in the electronic article 22. The commentary selection module 222 can be configured to process comment Y1 based on natural language processing techniques to determine whether or not comment Y1 has the particular opinion, type of content, and/or supports the particular proposition within the electronic article 22. If the comment Y1 has the particular opinion, type of content, and/or supports the particular proposition within the electronic article 22, the comment Y1 can be selected by the commentary selection module 222 for placement within the electronic article 22.

In some implementations, the commentary selection module 222 can be configured to process any portion of the commentary 23 to select a portion of the commentary 23 for placement in the electronic article 22 to clarify ambiguous statements and/or facts. For example, in some implementations, the commentary selection module 222 can be configured to process one or more portions of the commentary 23 based on natural language processing techniques, keyword matching, and/or so forth to identify an ambiguous statement and/or fact. The commentary selection module 222 can be configured to process comment Y1 based on natural language processing techniques to determine whether or not comment Y1 may clarify the ambiguous statement and/or fact.

Although not explicitly shown in FIG. 2, combinations of commentary placement indicators (such as commentary placement indicator 24) can be used by the commentary selection module 222 to select at least a portion of the commentary 23 for placement within the electronic article 22. For example, a first commentary placement indicator can specify a time window for at least a portion of the commentary 23 to be placed in the electronic article 22, and a second commentary placement indicator can specify a type of content to be placed in the electronic article. Accordingly, the commentary selection module 222 can be configured to select at least a portion of the commentary 23 (e.g., one or more of comments Y1 through YN) for placement in the electronic article 22 based on the first commentary placement indicator and based on the second commentary placement indicator. As another example, a first commentary placement indicator can specify a maximum number of comments for placement in the electronic article 22, and a second commentary placement indicator can specify a location for placement of at least a portion of the commentary 23 in the electronic article. Accordingly, at least a portion of the commentary 23 (e.g., one or more of comments Y1 through YN) can be selected by the commentary selection module 222 for placement in the electronic article 22 based on the first commentary placement indicator and based on the second commentary placement indicator.

In some implementations, if at least a portion of the commentary 23 does not satisfy (or match) one or more commentary placement indicators (such as commentary placement indicator 24) associated with the electronic article 22, none of the commentary 23 may be placed within the electronic article 22. In other words, if at least a portion of the commentary 23 does not match with (e.g., does not have a characteristic or attribute that matches with) one or more commentary placement indicators (such as commentary placement indicator 24) associated with the electronic article 22, none of the commentary 23 may be placed within the electronic article 22. In some implementations, at least a portion of commentary 23 can be placed within the electronic article 22 if the portion of the commentary 23 satisfies (e.g., matches) less than all, but more than a threshold number of characteristics identified by a set of commentary placement indicators.

In some implementations, the commentary selection module 222 can be configured to identify several portions of the commentary 23 that satisfy (e.g., match, meet) one or more commentary placement indicators (such as commentary placement indicator 24) associated with the electronic article 22. In some implementations, the commentary selection module 222 can be configured to select a first match of the commentary 23 for placement in the electronic article 22. In other words, a portion of the commentary 23 that is identified as satisfying one or more commentary placement indicators (e.g., a threshold number of commentary placement indicators, all of the commentary placement indicators) associated with the electronic article 22 can be selected by the commentary selection module 222 for placement in the electronic article 22. As a specific example, several commentary placement indicators associated with the electronic article 22 can target a portion of the commentary 23 that is produced by a specified set of user accounts (e.g., a set of user accounts within a social network of a requesting user), defined within a threshold time period, and excludes specified words. A portion of the commentary 23 can be placed in the electronic article 22 because the portion of the commentary 23 satisfies each of these criteria even though other portions of the commentary 23 may also satisfy each of these criteria. In some implementations, the portion of the commentary 23 can be placed in the electronic article 22 because the portion of the commentary 23 is processed before the other portions of the commentary 23 are processed (e.g., would be processed or are scheduled for processing). In some implementations, further processing of the commentary 23 may be terminated in response to at least one portion of the commentary 23 satisfying criteria associated with the commentary placement indicator.

In some implementations, the commentary selection module 222 can be configured to rank order several portions of the commentary 23 that satisfy one or more commentary placement indicators (such as commentary placement indicator 24) associated with the electronic article 22. In some implementations, the rank ordering can be based on relevance (or a degree of matching) to the commentary placement indicators. For example, a first portion of the commentary 23 that has a relatively high ranking (e.g., high ranking value) can be placed at a location within the electronic article 22 instead of a second portion of the commentary 23 that has a relatively low ranking (e.g., low ranking value). In some implementations, rank ordering of portions of the commentary 23 can be based on one or more weight factors (e.g., weight values) associated with one or more commentary placement indicators. For example, a match of a first portion of the commentary 23 with a criteria described within a first commentary placement indicator can have a greater weight within a ranking of the portion of the commentary than a match of a second portion of the commentary 23 with the criteria described within a second commentary placement indicator.

As shown in FIG. 2, the commentary processor 220 includes a commentary placement module 226. The commentary placement module 226 is configured to include (e.g., place, insert) at least a portion of the commentary 23 in the electronic article 22 after the portion of the commentary 23 has been selected by the commentary selection module 222 (e.g., selected based on the commentary placement indicator 24). In some implementations, commentary placement module 226 can be configured to place (or trigger placement of) at least a portion of the commentary 23 in the electronic article 22 before electronic article 22 is served to (e.g., sent to) the computing device 85 (which is functioning as a requesting device). After the commentary placement module 226 places (or triggers placement) of the portion of the commentary 23 in electronic article 22, the commentary placement module 226 can be configured to trigger sending of the electronic article 22 to the computing device 85.

For example, a request for the electronic article 22 can be sent from the computing device 85 to the article host 280. An indicator of the request can be received at the article modification module 210. The article modification module 210 can be configured to place comment Y2 from the commentary 23 in the electronic article 22 in accordance with the commentary placement indicator 24 (or another commentary placement indicator (not shown)). The article modification module 210 can be configured to place (or trigger placement of) the comment Y2 from the commentary 23 in the electronic article 22 before electronic article 22 is sent (e.g., is served) from the article host 280 to the computing device 285.

In some implementations, the article modification module 210 can be configured to dynamically include at least a portion of the commentary 23 in the electronic article 22 after the electronic article 22 has been served to the computing device 85 in response to a request for the electronic article 22. For example, a request for the electronic article 22 can be sent from the computing device 85 to the electronic host 280. In response to the request, electronic article 22 can be sent from the article host 280 to the computing device 85. After the electronic article 22 has been received at the computing device 85, the article modification module 210 can be configured to include comment Y2 from the commentary 23 in the electronic article 22 in accordance with the commentary placement indicator 24 (or another commentary placement indicator (not shown)). Accordingly, the article modification module 210 can be configured to include (or trigger placement of) the comment Y2 from the commentary 23 in the electronic article 22 after electronic article 22 is sent (e.g., is served) from the article host 280 to the computing device 285.

In some implementations, multiple comments from the commentary 23 can be streamed into (e.g., dynamically updated within) the electronic article 22 even as the electronic article 22 is being viewed at the computing device 85. In other words, a first portion of the commentary 23 (in accordance with the commentary placement indicator 24) can be placed (or triggered to be placed in) in the electronic article 22 by the article modification module 210 before or after electronic article 22 is sent (e.g., is served) to the computing device 85. A second portion of the commentary 23 (in accordance with the commentary placement indicator 24) can be placed in (or triggered to be placed in) the electronic article 22 by the article modification module 210, in addition to, or in place of the first portion of the commentary 23 as the electronic article 22 is being viewed at the computing device 85.

As described above, in some implementations, at least a portion of the functionality of the article modification module 210 can be included in the computing device 85 and/or the article host 280. Accordingly, in some implementations, the electronic article 22 can be modified with at least a portion of the commentary 23 at the computing device 85 before the electronic article 22 is presented (e.g., displayed) to a user of the computing device 85. As another example, the electronic article 22 can be modified with at least a portion of the commentary 23 at the article host 280 before the electronic article 22 is sent to (e.g., served to) the computing device 85.

As shown in FIG. 2, the article processor 230 includes an article content processor 236. The article content processor 236 is configured to process content of the electronic article 22 to define one or more commentary placement indicators (the same as or similar to commentary placement indicator 24). For example, the article content processor 236 can be configured to process a portion of an electronic article (e.g., electronic article 22) and can be configured to define a commentary placement indicator indicating that a comment may be placed in the electronic article at a specified location within the electronic article.

As a more specific example, the article content processor 236 can be configured to process content of a paragraph in an electronic article based on natural language processing techniques, keyword analysis, and/or so forth to identify subject matter of the paragraph of the electronic article. The article content processor 236 can be configured to define one or more commentary placement indicators indicating the subject matter of the paragraph and a location within the paragraph where at least a portion of commentary associated with the electronic article may be placed. In response to the electronic article being requested by a computing device for viewing, the article modification module 210 (e.g., the commentary selection module 222) can be configured to select (e.g., selected based on processing of the commentary, select based on matching keywords from the commentary with keywords indicated within the commentary placement indicator(s)) and include at least a portion of the commentary associated with the electronic article in accordance with the commentary placement indicator(s). The portion of the commentary can be placed in the electronic article by the commentary placement module 226 before or after the electronic article is served to the computing device for viewing.

As shown in FIG. 2, commentary placement indicators 30 can be stored in a memory 270. The commentary placement indicators 30 can be similar to (or the same as) the commentary placement indicator 24 included in the electronic article 22. For example, one or more of the commentary placement indicators 30 can indicate a location for placement of a comment within the electronic article 22, subject matter of a comment to be placed in the electronic article 22, restrictions related to authorship of a comment to be placed in the electronic article 22, and/or so forth. In some implementations, rather than being included in the electronic article 22, the commentary placement indicator 24 can be stored as one of the commentary placement indicators 30. In such implementations, one or more of the commentary placement indicators 30 can be associated with the electronic article 22 and used to identify one or more portions of the commentary 23 to be placed in the electronic article 22 when served to the computing device 85.

As shown in FIG. 2, user preferences 31 can be stored in the memory 270. In some implementations, placement of at least a portion of the commentary 23 in the electronic article 22 can be based on one or more user preferences 31. The user preferences 31 can be related to a reader (or requestor) of the electronic article 22, an author of the electronic article 22, and/or an author of at least a portion of the commentary 23 related to the electronic article 22. For example, one or more of the user preferences 31 can have priority over one or more of commentary placement indicators (e.g., commentary placement indicator 24, commentary placement indicator 30). For example, even though the commentary placement indicator 24 can indicate that a comment less than a specified size is to be placed at a specified location within the electronic article 22, the user preferences 31 can indicate that a comment greater than the specified size and at a different location is to be placed within the electronic article 22. In such implementations, the article modification module 210 can be configured to select and include a comment in the electronic article 22 in accordance with the user preferences 31 rather than based on the commentary placement indicator 24.

In some implementations, placement of at least a portion of a commentary in one or more electronic articles may not be performed (e.g., may be prevented) based on one or more the user preferences 31. In other words, at least a portion of the functionality of the article modification module 210 may not be used (e.g., can be terminated) based on one or more of the user preferences 31 (e.g., a user preference of a reader (or requestor) of the electronic article 22, an author of the electronic article 22, and/or an author of at least a portion of the commentary 23 related to the electronic article 22). As a specific example, a particular comment may not be placed in an electronic article 22 based on a preference of an author of the particular comment. In some implementations, the preference can be stored as metadata associated with the comment. As another specific example, a particular electronic article 22 may not be processed for placement of at least a portion of the commentary 23 (or for placement of at least a portion of commentary 23 in a particular location) based on a preference of an author of the electronic article 22. In some implementations, the preference can be stored as metadata (or as a commentary placement indicator) associated with the comment.

In some implementations, the article modification module 210 can be configured to operate at one or more computing devices (e.g., computing device 85 or another computing device) that can each be, for example, a wired device and/or a wireless device (e.g., wi-fi enabled device) and can be, for example, a computing entity (e.g., a personal computing device), a server device (e.g., a web server), a mobile phone, a touchscreen device, a personal digital assistant (PDA), a laptop, a tablet device, e-reader, and/or so forth. The computing device(s) can be configured to operate based on one or more platforms (e.g., one or more similar or different platforms) that can include one or more types of hardware, software, firmware, operating systems, runtime libraries, and/or so forth.

The article modification module 210 can be configured to operate based on one or more platforms (e.g., one or more similar or different platforms) that can include one or more types of hardware, software, firmware, operating systems, runtime libraries, and/or so forth. In some implementations, the article modification module 210 can be configured to operate within a cluster of devices (e.g., a server farm). In such an implementation, the functionality and processing of the article modification module 210 can be distributed to several devices of the cluster of devices.

The article modification module 210 can be, or can include, any type of hardware and/or software configured to process attributes. In some implementations, one or more portions of the components shown in the article modification module 210 in FIG. 2 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the article modification module 210 can be, or can include, a software module configured for execution by at least one processor (not shown). In some implementations, the functionality of the components can be included in different modules and/or different components than those shown in FIG. 2. For example, although not shown, the functionality of the commentary processor 220 of the article modification module 210 can be included in a different module than the commentary processor 220 of the article modification module 210, or divided into several different modules.

Although not shown, in some implementations, the article modification module 210 (or portions thereof) can be configured to operate within, for example, a data center (e.g., a cloud computing environment), a computer system, one or more server/host devices, and/or so forth. In some implementations, the article modification module 210 (or portions thereof) can be configured to operate within a network. Thus, the article modification module 210 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, the memory 270 can be any type of memory such as a random-access memory, a disk drive memory, flash memory, and/or so forth. In some implementations, the memory 270 can be implemented as more than one memory component (e.g., more than one RAM component or disk drive memory) associated with the article modification module 210. In some implementations, the memory 270 can be a database memory. In some implementations, the memory 270 can be, or can include, a non-local memory. For example, the memory 270 can be, or can include, a memory shared by multiple devices (not shown). In some implementations, the memory 270 can be associated with a server device (not shown) within a network and configured to serve the article modification module 210.

Figure 3:
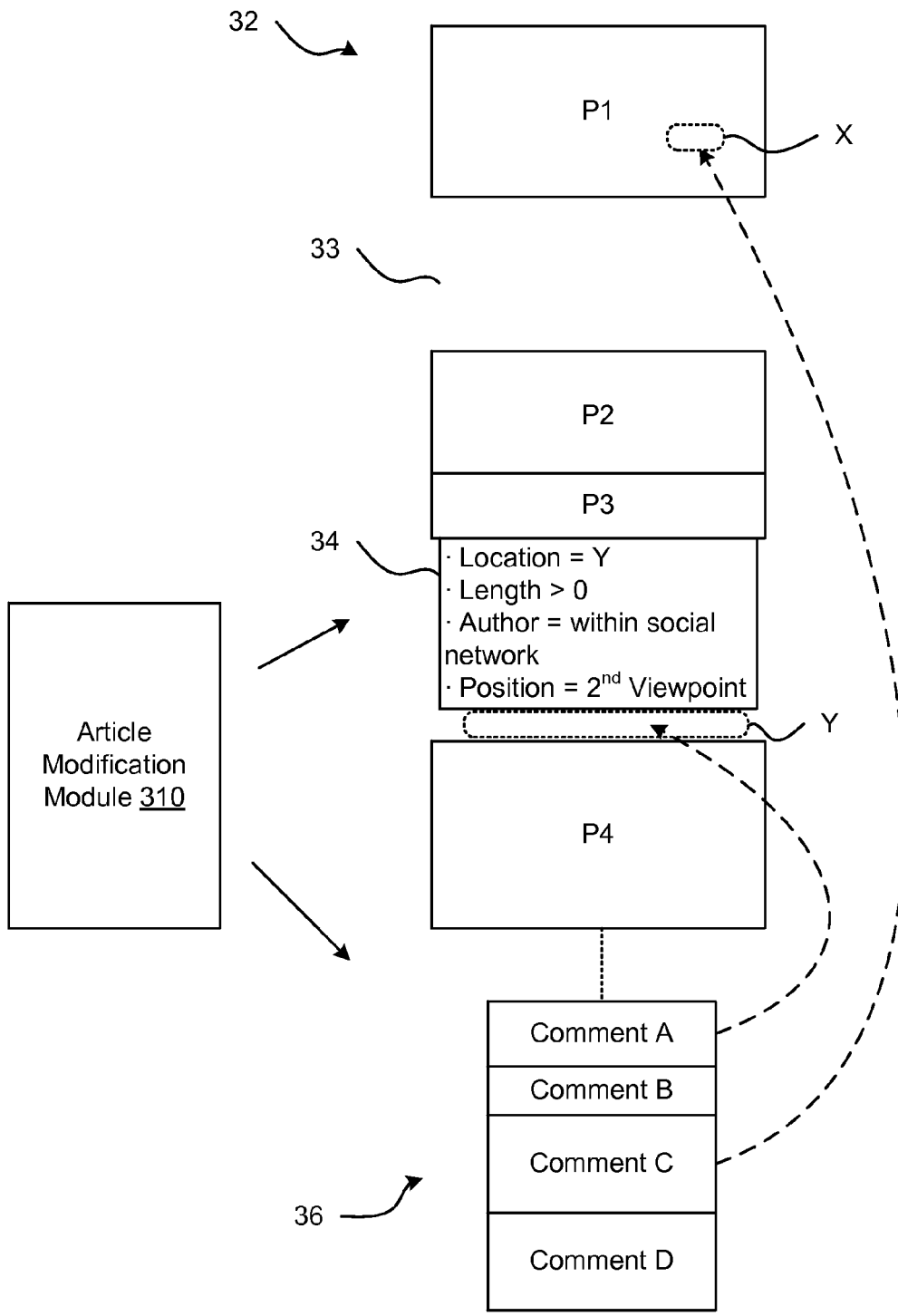
FIG. 3 is a diagram that illustrates example commentary placement indicators associated with an electronic article, according to an implementation.

FIG. 3 is a diagram that illustrates commentary placement indicators 33, 34 associated with an electronic article 32, according to an implementation. In this implementation, the commentary placement indicators 33, 34 are embedded within the electronic article 32. In some implementations, the commentary placement indicators 33, 34 can be metadata associated with the electronic article 32. In this implementation, the electronic article 32 includes paragraphs P1 through P4. In some implementations, paragraphs P1 through P4 can be portions of the electronic article 32. Although not shown in FIG. 3, in some implementations, the electronic article 32 can be hosted at an article host (e.g., article host 280 shown in FIG. 2).

FIG. 3 also illustrates commentary 36, which includes comments A through D, associated with (as illustrated by the dashed line) the electronic article 32. In this implementation, the commentary 36 can be displayed after the electronic article 32. In some implementations, one or more of the comments included in the commentary 36 can be authored via different user accounts and/or computing devices.

As shown in FIG. 3, the commentary placement indicators 33, 34 include several criteria. In this implementation, an article modification module 310 is configured to select and include comment C at location X within paragraph P1 based on the commentary placement indicator 33. In some implementations, the comment C can be placed in-line within paragraph P1. The comment C is selected by the article modification module 310 because comment C (as indicated by the commentary placement indicator 33) has a length less than Y characters, was produced within the last 2 days, and has content aligned with (or contrary to) a first viewpoint of the electronic article 32. In some implementations, subject matter of the paragraph P1 around (e.g., adjacent to) location X can be aligned with (or contrary to) the first viewpoint.

Also, in this implementation, an article modification module 310 is configured to select and include comment A at location Y between paragraphs P3 and P4 based on the commentary placement indicator 34. The comment A is selected by the article modification module 310 because comment A (as indicated by the commentary placement indicator 34) has a length greater than 0, was authored by a user within a social network of a requesting user, and has content aligned with (or contrary to) a second viewpoint of the electronic article 32. In some implementations, subject matter of the paragraph P3 or P4 around (e.g., adjacent to) location Y can be aligned with (or contrary to) the second viewpoint.

In some implementations, the first viewpoint of the electronic article 32 can be a contrary viewpoint to the second viewpoint of the electronic article 32. Accordingly, the electronic article 32 can include differing, or polarized, comments (e.g., comments with different opinions or viewpoints) at different locations within the electronic article 32.

Figure 4:
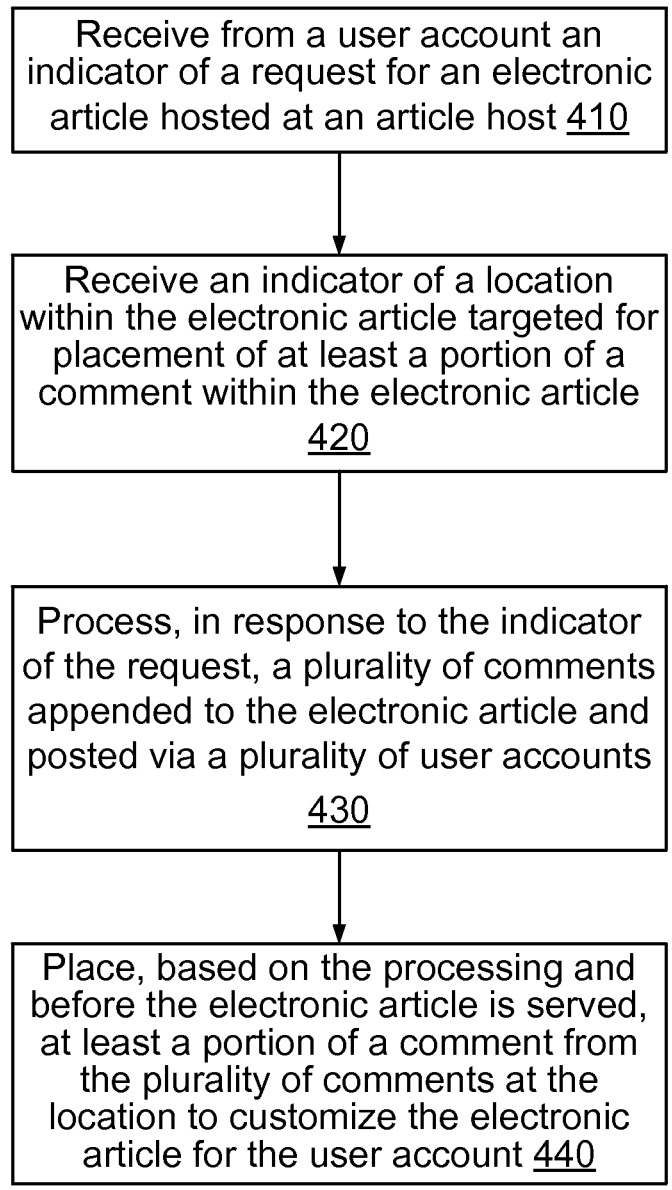
FIG. 4 is a flowchart that illustrates an example method for placing a comment in an electronic article, according to an implementation.

FIG. 4 is a flowchart that illustrates a method (e.g., process) for placing a comment in an electronic article, according to implementation. In some implementations, at least some portions of the method can be performed by any of the article modification modules described herein (e.g., article modification module 210 shown in FIG. 2).

As shown in FIG. 4, an indicator of a request for an electronic article is received from a user account (block 410). In some implementations, the indicator of the request for the electronic article can be received by the article handler 234 shown in FIG. 2. In some implementations, the request for the electronic article can be produced by a requesting computing device (via a user account of a requesting user).

An indicator of a location within the electronic article targeted for placement of at least a portion of a comment within the electronic article is received (block 420). In some implementations, the indicator of the location within the electronic article can be received by the commentary selection module 222 shown in FIG. 2. In some implementations, the indicator of the location can be specified within a commentary placement indicator (e.g., commentary placement indicator 24). In some implementations, the indicator of location within the electronic article can be identified by the article content processor 236 shown in FIG. 2.

A plurality of comments appended to the electronic article and posted via a plurality of user accounts can be processed in response to the indicator of the request (block 430). In some implementations, the plurality of comments can be processed by the commentary selection module 222 shown in FIG. 2. In some implementations, at least a portion of the plurality of comments can be processed using, for example, natural language processing techniques, keyword analysis, and/or so forth.

At least a portion of a comment from the plurality of comments is placed at the location to customize the electronic article for the user account based on the processing and before the electronic article is served (block 440). In some implementations, the article can be served to a requesting computing device. In some implementations, the comment can be selected from the plurality of comments by the commentary selection module 222 shown in FIG. 2. In some implementations, the plurality of comments can be a pool of comments identified based on one or more criteria (e.g., spelling criteria, quality criteria, commentary placement indicators). In some implementations, a comment can be selected and placed within the electronic article after the electronic article is served to a requesting computing device.

Figure 5:
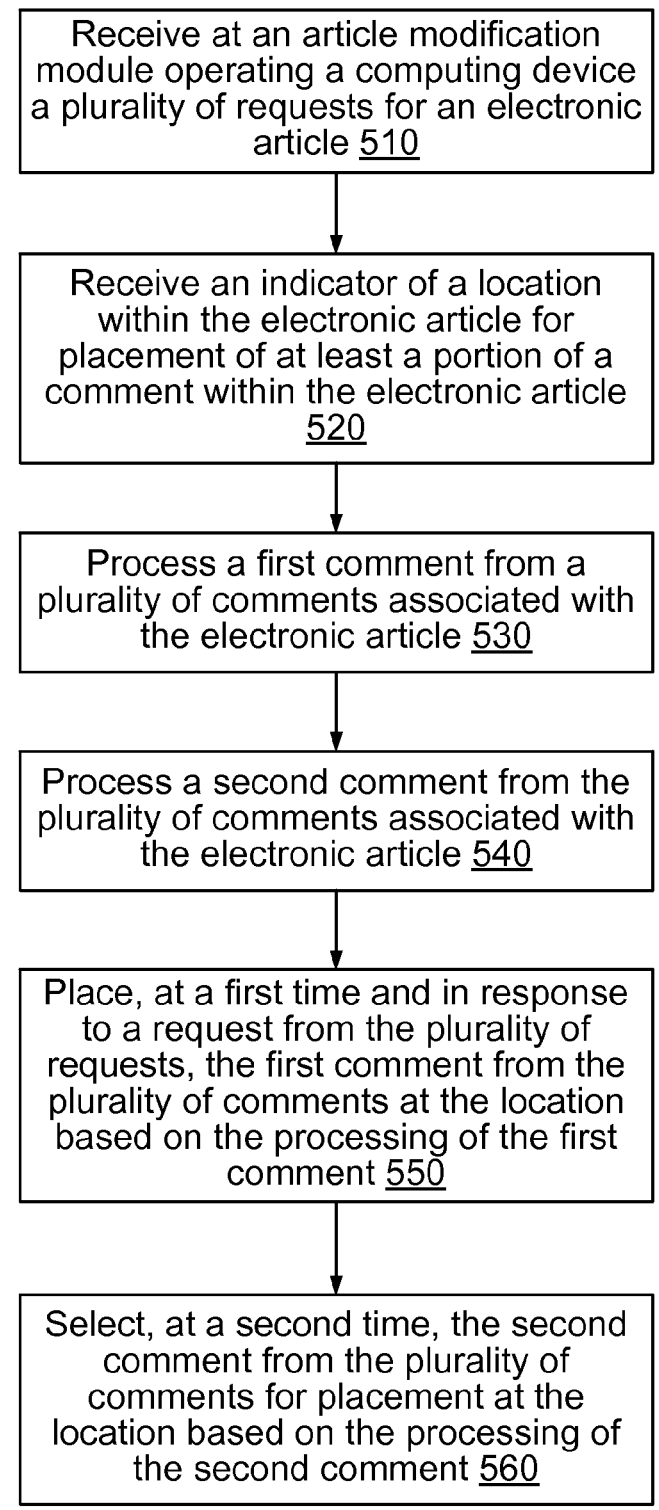
FIG. 5 is a flowchart that illustrates another example method for placing a comment in an electronic article, according to an implementation.

FIG. 5 is a flowchart that illustrates another method (e.g., process) for placing a comment in an electronic article, according to implementation. In some implementations, at least some portions of the method can be performed by any of the article modification modules described herein (e.g., article modification module 210 shown in FIG. 2).

As shown in FIG. 5, a plurality of requests for an electronic article are received at an article modification module operating a computing device (block 510). In some implementations, the plurality of requests for the electronic article can be received by the article handler 234 of the article modification module 210 shown in FIG. 2. In some implementations, the plurality of requests for the electronic article can be produced by a plurality of requesting computing devices (via user accounts of requesting users).

An indicator of a location within the electronic article for placement of at least a portion of a comment within the electronic article is received (block 520). In some implementations, the indicator of the location within the electronic article can be received by the commentary selection module 222 shown in FIG. 2. In some implementations, the indicator of location can be specified within a commentary placement indicator (e.g., commentary placement indicator 24). In some implementations, the indicator of location within the electronic article can be identified by the article content processor 236 shown in FIG. 2.

A first comment from a plurality of comments associated with the electronic article is processed (block 530). Also, a second comment from the plurality of comments associated with the electronic article is processed (block 540). In some implementations, the first comment and/or the second comment can be processed by the commentary selection module 222 shown in FIG. 2. In some implementations, the first comment and/or the second comment can be processed using, for example, natural language processing techniques, keyword analysis, and/or so forth.

A first comment from the plurality of comments is placed at the location based on the processing of the first comment at a first time and in response to a request from the plurality of requests (block 550). A second comment from the plurality of comments is selected for placement at the location based on the processing of the second comment at a second time (block 560). In some implementations, the first comment and the second comment can be placed at the location by the commentary placement module 226 shown in FIG. 2.

In some implementations, the request can be sent from a computing device and/or a user account. The second comment can be selected in response to a second request from the plurality of requests, and the second request can be sent from the same computing device and/or the same user account. In such implementations, the first comment can be dynamically replaced by (e.g., updated with) the second comment. In some implementations, the first request and the second request can be sent from different computing devices and/or different user accounts.

In some implementations, the processing associated with the first comment and the processing associated with the second comment are performed before the receiving of the request from the plurality of requests. In some implementations, the first comment and the second comment can be processed and/or categorized for placement in response to requests for the electronic article as the requests are received.

Referring back to FIG. 2, the article modification module 210 includes a commentary interaction manager 240. The commentary interaction manager 240 can be configured to handle interactions with the commentary 23 after at least a portion of the commentary 23 has been placed within the electronic article 22 (for consumption by a reader).

In some implementations, at least a portion of the commentary 23 that has been placed within the electronic article 22 can include, or can be associated with, an interaction portion (not shown) (also can be referred to as an interactive portion) through which a reader of the electronic article 22 can interact with the portion of the commentary 23. In some implementations, the interaction portion can be managed by the commentary interaction manager 240. In some implementations, the interaction portion can be, or can include, for example, at least a portion of a user interface. In some implementations, the interaction portion can be a type of user interface element.

In some implementations, the commentary interaction manager 240 can be configured to receive one or more indicators (e.g., input values, data) produced via an interaction portion associated with at least a portion of the commentary 23 placed in the electronic article 22. For example, an interaction of a user (e.g., reader) with at least one of the interaction portions can be configured to trigger an input value that can be received by the commentary interaction manager 240. In some implementations, the commentary interaction manager 240 can be configured to process the input value or can be configured to trigger one or more functions to be performed by other modules (e.g., commentary processor 220) included in the article modification module 210.

One or more portions of the commentary 23, when placed within the electronic article 22, can be configured with (e.g., can be associated with) an interaction portion so that a reader of the portion(s) of the commentary 23 can perform various functions such as modify portion(s) of the commentary 23, manipulate portion(s) of the commentary 23, and/or so forth. The interaction portion (or portions) can be associated with a specific portion of the commentary 23, or generally to several portions commentary 23. In some implementations, the interaction portion can be used to permanently, or temporarily, modify one or more portions of the commentary 23 for a later reader of the commentary 23 placed within the electronic article 22. In some implementations, one or more interaction portions can have one or more functions such as those described below (e.g., can include a combination of one or more of the functions described below).

As a specific example, one or more portions of the commentary 23, when placed within the electronic article 22, can be configured with (e.g., can be associated with) an interaction portion so that a reader of the portion(s) of the commentary 23 can add information (e.g., data, comments) to the portion(s) of the commentary 23 (that is placed within the electronic article 22), to the electronic article 22, and/or a portion of the commentary 23 not placed within the electronic article 22. In some implementations, the information added to the portion(s) of the commentary 23 can be additional commentary. In some implementations, additional commentary can be added to the commentary 23 that is linked to (e.g., electronically linked to), for example, comment Y1 via an interaction portion.

As another specific example, if comment Y1 is placed within the electronic article 22 for consumption by a reader, the comment Y1 can be associated with an interaction portion that functions as an element through which a reader of the comment Y1 can post an indicator of an opinion (e.g., approval (e.g., a like), disapproval (e.g., a dislike), apathy, etc.) to the comment Y1. The indicator of the opinion can be stored and displayed for later readers of the comment Y1.

As yet another specific example, if comment Y1 is placed within the electronic article 22 for consumption by a reader, the comment Y1 can be associated with an interaction portion that functions as an element through which a reader can trigger replacement of comment Y1 with another portion of the commentary 23. The comment Y1 can be placed within the electronic article 22 based on one or more criteria. The reader, can trigger the comment Y1 to be replaced with the comment YN in response to actuation of, for example, a user interface element (e.g., a virtual button) associated with the interaction portion. In some implementations, the comment YN can be the next best (or similar) comment for placement in the electronic article 22 based on the one or more criteria used to select comment Y1 for placement in the electronic article 22. In other words, the comment YN can be a comment that would have been placed within the electronic article 22 had comment Y1 not been a better match for placement within the electronic article 22 than the comment YN. The comment YN can be rank-ordered as the next best comment for placement in the electronic article 22 relative to comment Y1.

In some implementations, the comment Y1 can be replaced (using the interaction portion) with at least a portion of commentary 23 based on criteria different than criteria used to select comment Y1 for placement within the electronic article 22. In some implementations, if comment Y1 is placed within the electronic article 22 for consumption by a reader, the comment Y1 can be associated with an interaction portion that functions as an element through which a reader can trigger replacement of comment Y1 with a randomly selected portion of the commentary 23.

As another example, if comment Y2 is placed within the electronic article 22 for consumption by a reader, comment Y2 can be associated with an interaction portion that functions as an element through which a reader of the comment Y2 can remove (e.g., delete) all, or a portion, of the comment Y2 from the electronic article 22 and/or the commentary 23. In some implementations, the interaction portion can be configured to limit (e.g., based on one or more criteria included in one or more placement indicators) the ability of the reader to modify one or more portions of the comment Y2.

As yet another example, if comment Y2 is placed within the electronic article 22 for consumption by a reader, comment Y2 can be associated with an interaction portion that functions as an element through which a reader of the comment Y2 can move (e.g., open, close, minimize, escape, scroll, page through) a portion of the comment Y2. In some implementations, the interaction portion can be configured to implement movement capabilities based on the length of the comment Y2, the orientation of the comment Y2, the orientation of the comment Y to within the electronic article 22, and/or so forth, which can be specified within one or more placement indicators.

In some implementations, one or more functions associated with an interaction portion associated with at least a portion of the commentary 23 can remain hidden, or can be visible to a reader. In some implementations, one or more functions associated with the interaction portion can be visible, or hidden, based on authorization for a particular reader of the portion of the commentary 23. In some implementations, criteria for the authorization can be specified within one or more placement indicators.

As mentioned above, in some implementations, an interaction portion (not shown) can be associated with (e.g., included in) commentary 23 placed within the electronic article 22 based on one or more placement indicators such as placement indicator 24. For example, an interaction portion of a particular type can be associated with commentary 23 placed within the electronic article 22 based on the placement indicator 24. As a specific example, an interaction portion, through which the reader can post a comment, can be associated with at least a portion of the commentary 23 placed within the electronic article 22 based on the placement indicator 24. As another specific example, an interaction portion, through which the reader can post an indicator or approval, disapproval, and so forth, can be associated with at least a portion of the commentary 23 placed within the electronic article 22 based on the placement indicator 24.

Figure 6:
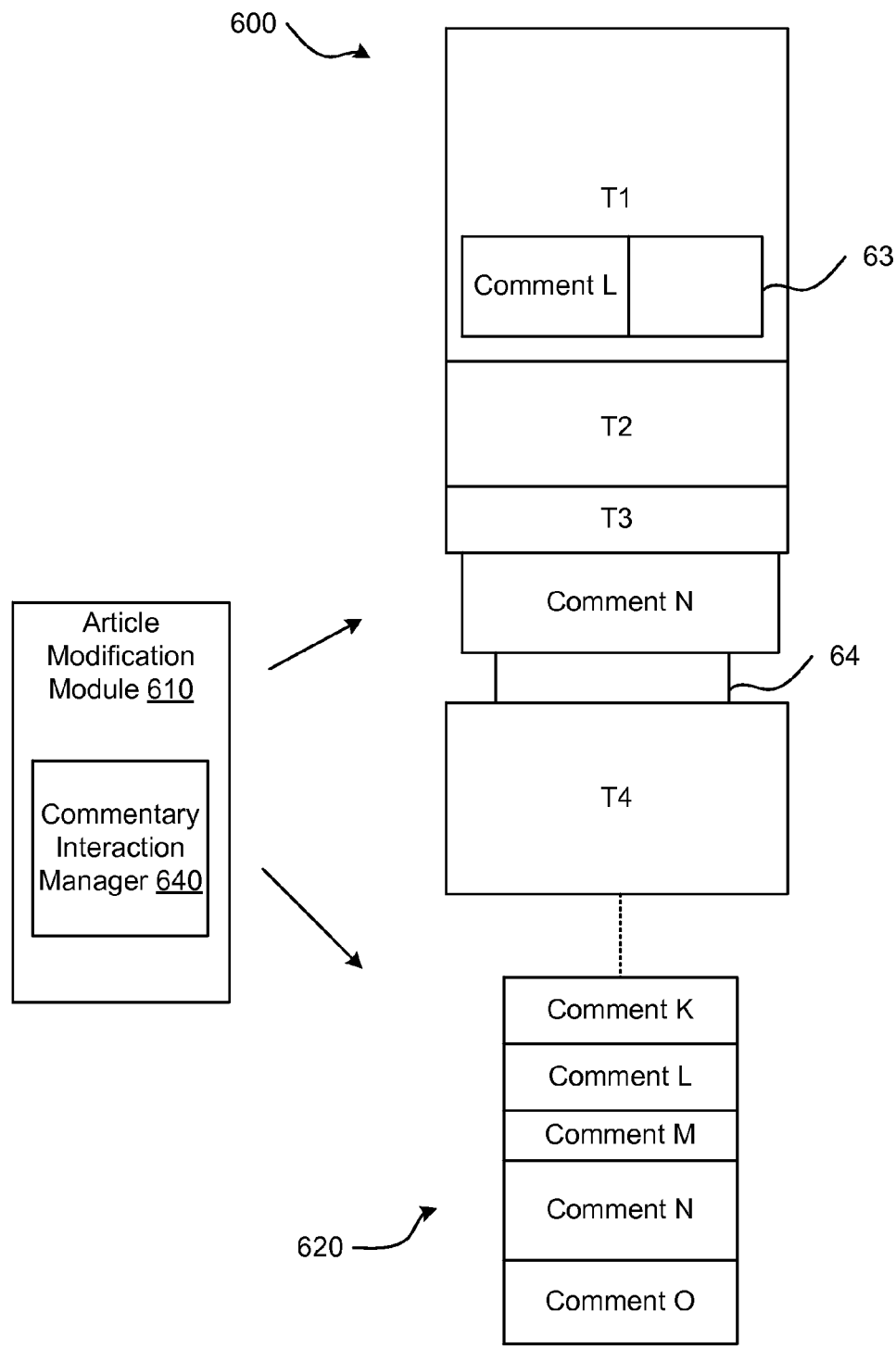
FIG. 6 is a diagram that illustrates interactive commentary associated with an electronic article, according to an implementation.

FIG. 6 is a diagram that illustrates interaction portions 63, 64 associated with commentary placed within an electronic article 600, according to an implementation. The interaction portions 63, 64 can be associated with commentary placed within the electronic article 600 using an article modification module 610, which includes a commentary interaction manager 640. In this implementation, the electronic article 600 includes paragraphs T1 through T4. Although not shown in FIG. 6, in some implementations, the electronic article 600 can be hosted at an article host (e.g., article host 280 shown in FIG. 2).

As shown in FIG. 6, the electronic article 600 is associated with (as illustrated by the dashed line) commentary 620, which includes comments K through O. In this implementation, the commentary 620 can be displayed after the electronic article 600. In some implementations, one or more of the comments included in the commentary 620 can be authored via different user accounts and/or computing devices.

As shown in FIG. 6, comment L (e.g., a copy of comment L) is included in paragraph T1 and is associated with interaction portion 63. Comment N (e.g., a copy of comment N) is included at a location between paragraphs T3 and T4. In this implementation, comment N is associated with interaction portion 64.

In some implementations, the commentary interaction manager 640 can be configured to receive one or more indicators (e.g., input values, data) produced via the interaction portions 63, 64. For example, an interaction of a user with at least one of the interaction portion 63, 64 can be configured to trigger an input value that can be received by the commentary interaction manager 640. In some implementations, the commentary interaction manager 640 can be configured to process the input value or can be configured to trigger one or more functions to be performed by other modules (not shown) included in the article modification module 610.

In this implementation, interaction portion 63 can be a portion through which at least a portion of comment L can be replaced by another comment. For example, the comment L can be included in the paragraph T1 by the article modification module 610 based on one or more commentary placement indicators (not shown). In response to an interaction of a reader of the electronic article 600 with the interaction portion 63 (or a portion thereof), the comment L can be replaced with another comment from the commentary 620. Specifically, the article modification module 610 can be triggered to process the commentary 620 based on the commentary placement indicator(s) to select another comment from the commentary 620 for inclusion in the electronic article 600 and to replace comment L in the electronic article 600. In some implementations, comment L can be the best match with criteria included in the commentary placement indicator(s). Accordingly, the comment selected to replace the comment L can be the next best match (e.g., next best match to comment L) with the criteria included in the commentary placement indicator(s).

In some implementations, the article modification module 610, when performing processing to place (or to replace) the comment L in the electronic article 600, can be configured to rank order several of the comments for placement in the electronic article 600 based on one or more commentary placement indicators. In such implementations, the comment L can be the best match in the rank-ordered list of comments for placement in the electronic article 600. Accordingly, in response to replacement of the comment L being triggered via the interaction portion 63, the comment L can be replaced with another of (e.g., the next of) the comments included in the rank-ordered list. In some implementations, interaction portion 63 can be used to place another comment similar to, or different (e.g., opposite) than, comment L in the electronic article 600 (rather than replace comment L).

In this implementation, the interaction portion 64 can be configured as a user interface portion through which information can be added in conjunction with comment N. For example, interaction portion 64 can be used by a reader of the comment N to add commentary to the comment N, attach an indicator of a like/dislike of the comment N, and/or so forth. In some implementations, the interaction portion 64 can be configured as a user interface portion through which information can be removed from comment N.

In this implementation, commentary the interaction portions 63, 64 are embedded within the electronic article 600. In some implementations, the interaction portions 63, 64 can collectively form a user interface associated with, or integrated into, the electronic article 600.

Implementations of the various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry (e.g., an FPGA (field programmable gate array) or an ASIC (application-specific integrated circuit)).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data (e.g., magnetic, magneto-optical disks, or optical disks). Information carriers suitable for embodying computer program instructions and data include all forms of non-volatile memory, including by way of example semiconductor memory devices (e.g., EPROM, EEPROM, and flash memory devices); magnetic disks (e.g., internal hard disks or removable disks); magneto-optical disks; and CD-ROM and DVD-ROM disks. The processor and the memory may be supplemented by, or incorporated in special purpose logic circuitry.

To provide for interaction with a user, implementations may be implemented on a computer having a display device (e.g., a cathode ray tube (CRT), a light emitting diode (LED), or liquid crystal display (LCD) display device) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

Implementations may be implemented in a computing system that includes a back-end component (e.g., as a data server), or that includes a middleware component (e.g., an application server), or that includes a front-end component (e.g., a client computer having a graphical user interface or a Web browser) through which a user can interact with an implementation, or any combination of such back-end, middleware, or front-end components. Components may be interconnected by any form or medium of digital data communication (e.g., a communication network). Examples of communication networks include a local area network (LAN) and a wide area network (WAN) (e.g., the Internet).

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A non-transitory computer-readable storage medium storing instructions that when executed cause at least one processor of a computer system to perform a process, the process comprising:
   receiving from a computing device, an indicator of a request for an electronic article;
   identifying, in response to the indicator of the request from the computing device, a location within the electronic article for placement of at least a portion of a comment within the electronic article based on subject matter of content in the electronic article and subject matter of the at least the portion of the comment;
   processing, in response to the indicator of the request, a plurality of comments associated with the electronic article and posted via a plurality of user accounts;
   placing, based on the processing and before the electronic article is served, at least a portion of a comment from the plurality of comments at the identified location to customize the electronic article for a user account associated with the computing device, wherein the identified location at which the portion of the comment is placed is different than a location identified within the electronic article for a different user account associated with a different computing device; and
   providing the customized electronic article to the computing device for display of the portion of the comment at the determined location within the electronic article at the computing device.

2. The computer-readable storage medium of claim 1, wherein the location is identified based on a user preference.

3. The computer-readable storage medium of claim 1, wherein the comment is a first comment, the location is associated with a portion of the electronic article identified as having a first opinion,
   the process further comprising:
   identifying a location associated with a portion of the electronic article as having a second opinion different from the first opinion; and
   selecting at least a portion of a second comment from the plurality of comments for placement at the location associated with the portion of the electronic article identified as having a second opinion.

4. The computer-readable storage medium of claim 1, wherein a comment is excluded from the plurality of comments based on at least one word included in the comment.

5. The computer-readable storage medium of claim 1, the processing is performed based on natural language processing techniques;
   the process further comprising:
   identifying the location within the electronic article based on the processing of the electronic article; and
   producing an indicator of the location in response to the identifying.

6. The computer-readable storage medium of claim 1, wherein the at at least the portion of the comment is placed based on a size of the at least the portion of the comment.

7. The computer-readable storage medium of claim 1, wherein the indicator of the request is received at a time, at least the portion of the comment is placed based on the comment being posted with a threshold time of the time.

8. The computer-readable storage medium of claim 1, wherein the indicator of the request is received at a time, at least the portion of the comment is placed based on the comment being posted with a threshold time period from the time.

9. The computer-readable storage medium of claim 1, the process further comprising:
   triggering replacement of the at least the portion of the comment en at the location after the electronic article has been served.

10. A method, comprising:
   receiving at a computing device, a plurality of requests for an electronic article;
   identifying, in response to a request from a computing device for the electronic article, a location within the electronic article for placement of at least a portion of a comment within the electronic article based on a user account associated with the computing device, subject matter of content in the electronic article, and subject matter of the at least the portion of the comment, wherein the identified location is different than a location identified within the electronic article for a different user account associated with a different computing device;
   processing a first comment from a plurality of comments associated with the electronic article;
   processing a second comment from the plurality of comments associated with the electronic article;

placing, at a first time and in response to the request from the computing device, the first comment from the plurality of comments at the identified location based on the processing of the first comment; and selecting, at a second time, the second comment from the plurality of comments for placement at the identified location based on the processing of the second comment.

11. The method of claim 10, wherein the processing associated with the first comment and the processing associated with the second comment are performed before the receiving of the request from the plurality of requests.

12. The method of claim 10, wherein the second comment is posted after the first time, and the processing the second comment is performed after the first time.

13. The method of claim 10, wherein the request is a first request from the plurality of requests, the first request from the plurality of requests is received before the first time and from a first user account, a second request from the plurality of requests is received before the second time and from a second user account.

14. The method of claim 10, wherein the placing, at the first time, is performed before the electronic article is served in response to the request from the plurality of requests.

15. The method of claim 10, wherein the processing associated with the first comment includes matching subject matter of the first comment with subject matter of the electronic article adjacent to the location.

16. The method of claim 10, further comprising:
sending the electronic article after the placing of the first comment; and
triggering replacement of the first comment by the second comment after the sending.

17. A system comprising: one or more computing devices configured to:
identify, in response to a request from a computing device for an electronic article, a location within an electronic article for placement of at least a portion of a plurality of comments associated with the electronic article based on a user account associated with the computing device, subject matter of content in the electronic article, and subject matter of the at least the portion of the comment, the subject matter of content at the location being associated with a viewpoint of the electronic article, wherein the identified location is different than a location identified within the electronic article for a different user account associated with a different computing device;
receive a request to access the electronic article after the location within the electronic article has been identified;
process, in response to the receiving the request, to access the electronic article a viewpoint associated with a comment from the plurality of comments; and
select the comment from the plurality of comments based on the viewpoint of the comment aligning with the viewpoint associated with the location.

18. The system of claim 17, wherein the location is a first location, the viewpoint is a first viewpoint, the comment is a first comment, the article modification module is configured to identify a second location associated with a second viewpoint opposing the first viewpoint, the commentary selection module is configured to select a second comment from the plurality of comments based on a viewpoint of the second comment aligning with the second viewpoint associated with the second location.

19. The system of claim 17, wherein the comment is a first comment, a second comment from the plurality of comments is excluded from selection based on content included in the second comment.

20. The system of claim 17, wherein the apparatus is further configured to compare the viewpoint of the comment with the viewpoint associated with the location before the selecting, and configured to insert the comment from the plurality of comments in the electronic article at the location after the selecting, and configured to trigger sending of the electronic article.

21. The system of claim 17, wherein the plurality of comments is a first plurality of comments, the apparatus is further configured to select the first plurality of comments from a second plurality of comments based on a time window.

22. The system of claim 17, wherein the portion of the plurality of comments is associated with an interaction portion.

\* \* \* \* \*